United States Patent
Razavi

(10) Patent No.: US 6,630,550 B1
(45) Date of Patent: Oct. 7, 2003

(54) OLEFIN POLYMERIZATION CATALYST

(75) Inventor: Abbas Razavi, Mons (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/658,069

(22) Filed: Sep. 11, 2000

Related U.S. Application Data

(63) Continuation-in-part of application No. 09/214,854, filed as application No. PCT/EP97/03649 on Jul. 10, 1997, now Pat. No. 6,448,349.

(30) Foreign Application Priority Data

Jul. 11, 1996 (EP) .............................. 96111127
Sep. 10, 1999 (EP) .............................. 99118105

(51) Int. Cl.$^7$ ................................. C08F 4/64
(52) U.S. Cl. .................. 526/160; 526/161; 526/165; 526/170; 526/172; 526/943; 502/103; 502/152; 502/167
(58) Field of Search ................. 526/161, 160, 526/165, 170, 172, 348, 943; 502/103, 152, 167

(56) References Cited

U.S. PATENT DOCUMENTS 5,334,677 A * 8/1994 Razavi et al.
5,672,669 A * 9/1997 Wasserman et al.

FOREIGN PATENT DOCUMENTS

| EP | 0628577 | 12/1994 |
| EP | 0931814 | 7/1999 |
| WO | 9319103 | 9/1993 |
| WO | 9600734 | 1/1996 |
| WO | 9802469 | 1/1998 |

OTHER PUBLICATIONS

"Inversion of stereoselectivity in a metallocene catalyst", T. Shiomura et al, Macromolecular: Rapid Communications, vol. 17, No. 1, pp. 9–14 (1996).

* cited by examiner

Primary Examiner—Caixia Lu
(74) Attorney, Agent, or Firm—William D. Jackson

(57) ABSTRACT

A catalyst for olefin polymerization of the formula:

$$R''(C_4R'_mC_5C_4R'_n)XMeQ$$

wherein X is an hetero atom ligand with one or two lone pair electrons selected from the elements of Group VA or VIA which is substituted or non-substituted: $(C_4R_m'C_5C_4R_n')$ is a 3,6-substituted fluorenyl; R' is hydrogen or hydrocarbyl radical having 1–20 carbon atoms, a halogen, an alkoxy, an alkoxy alkyl or an alkylamino or alkylsilyo radical, each R' being the same or different and m and n independently are 1, 2, 3 or 4, with bilateral symmetry maintained; R" is a structural bridge between S and $(C_4R'_mC_5C_4R'_n)$ to impart stereorigidity; Q is a hydrocarbyl radical having 1–20 carbon atoms or a halogen; Me is a Group IIIB, IVB, VB, or VIB metal having any of its theoretically possible oxidation states. Olefin monomers polymerised using these catalysts to form syndiotactic/atactic block polymers of high molecular weight and comprising at least 70% of syndiotactic triads.

15 Claims, No Drawings

OLEFIN POLYMERIZATION CATALYST

This application is a continuation in part of application Ser. No. 09/214,854, filed on Nov. 8, 1999 now U.S. Pat. No. 6,448,349, which claims priority benefit of International Application No. WO98/02469.

FIELD OF THE INVENTION

The invention relates to a metallocene catalyst useful in preparing syndiotactic/atactic block polyolefins and to the polymers so obtained. The catalyst comprises a bridged monocyclopentadienyl metallocene in which the cyclopentadienyl is part of a fluorene ligand which is substituted symmetrically with respect to the active coordination position and is 3,6 substituted. The invention further includes a process of preparing syndiotactic/actactic block polyolefins that comprises the use of the present catalyst.

The present invention also provides a process for polymerising olefins having three or more carbon atoms to produce polymers with syndiotactic/atactic stereochemical configurations. The catalyst and process of the invention are particularly useful in polymerising propylene to form a syndiotactic/atactic block polypropylene.

BACKGROUND TO THE INVENTION AND PRIOR ART DISCUSSION

As known in the art, syndiotactic polymers have a unique stereochemical structure in which monomeric units having enantiomorphic configuration of the asymmetrical carbon atoms follow each other alternately and regularly in the macromolecular main chain. Syndiotactic polypropylene was first disclosed by Natta et al. in U.S. Pat. No. 3,258,455. The Natta group obtained syndiotactic polypropylene by using a catalyst prepared from titanium trichloride and dietyl aluminium monochloride. A later patent to Natta et al., U.S. Pat. No. 3,305,538, discloses the use of vanadium triacetylacetonate or halogenated vanadium compounds in combination with organic aluminium compounds for producing syndiotactic polypropylene.

U.S. Pat. No. 3,364,190 to Emrick discloses a catalyst system composed of finely divided titanium or vanadium trichloride, aluminium chloride, a trialkyl aluminium and a phosphorus-containing Lewis base as producing syndiotactic polypropylene. U.S. Pat. No. 4,892,851 discloses a metallocene catalyst for producing highly crystalline syndiotactic polyolefins.

As disclosed in these patent references and as known in the art, the structure and properties of syndiotactic polypropylene differ significantly from those of isotactic polypropylene. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula, the sterochemical sequence of isotactic polypropylene is described as follows:

Another way of describing the structure is through the use of NMR. Bovey's NMR nomenclature of an isotactic pentad is ... mmmm ... with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structures, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

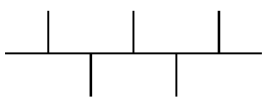

In NMR nomenclature, this pentad is described as ... rrrr ... in which each "r" represents a "racemic", i.e., successive methyl groups on alternate sides of the plane.

The percentage of r dyads in the chain determines the degree of syndiotacticity of the polymer. Syndiotactic polymers are crystalline and, like the isotactic polymers, are insoluble in xylene.

This crystallinity distinguishes both syndiotactic and isotactic polymers from an atactic polymer that is soluble in xylene. Atactic polymer exhibits no regular order of repeating unit configurations in the polymer chain and forms an essentially waxy product. While it is possible for a catalyst to produce all three types of polymer, it is desirable for a catalyst to produce predominantly syndiotactic or isotactic polymer with some atactic block fractions.

WO 98/02469 discloses use of metallocene catalysts in the formation of syndiotactic/atactic block homopolyolefins. The catalyst is a monocyclopentadienyl type catalyst. The cyclopentadienyl may be part of a fluorene ligand which is symmetrically substituted. The document is specifically concerned with 2,7 substituted fluorene ligands. However, the polymers produced using these catalysts do not have a melt temperature and are thus very sticky. This greatly reduces the utility of these polymers.

EP-A-0,931,814 discloses production of syndiotactic/atactic block polypropylene. The catalyst used in the production of the syndiotactic/atactic block polypropylene is a monocyclopentadienyl type catalyst. The cyclopentadienyl may be part of a fluorene ligand which is symmetrically substituted. The application is specifically concerned with 2,7 substituted fluorene ligands.

WO 96/00734 relates to group IV metal diene complexes and addition polymerisation catalysts produced therefrom. The document is particularly concerned with metallocenes having a cyclopentadienyl ligand and additionally a chelating alkenyl ligand.

Shiomura et al. disclose, in Macromol. Rapid Commun., 17, 9–14, (1996), inversion of stereoregularity in a metallocene catalyst. This document relates to an inversion of stereoselectivity of a particular metallocene from syndiospecific into isospecific by changing the cocatalyst. In particular, the document relates to an unsubstituted fluorene-containing metallocene.

EP-A-0,628,577 relates to fluorenyl-containing silyl bridged metallocenes, processes of using such metallocene to polymerise olefins and the syndiotactic polypropylene so produced. This document refers specifically to a 2,7-substituted fluorenyl type catalyst.

WO 93/19103 relates to a process and a metallocene catalyst system for the production of stereoregular polyolefins. The process permits improved control over tacticity, molecular weight and molecular weight distribution. In one example, the document relates to a polymerisation process employing a catalyst comprising an unsubstituted fluorene type ligand.

SUMMARY OF THE INVENTION

It is an object of the present invention to overcome the above and other problems associated with the prior art catalysts. Accordingly, the present invention provides a catalyst for the polymerisation of olefins of general formula:

$$R''(C_4R'_mC_5C_4R'_n)XMeQ$$

wherein X is an hetero-atom ligand with one or two lone pair electrons selected from the elements of Group VA or VIA which can be substituted or non-substituted; $(C_4R_m'C_5C_4R_n')$ is a symmetrically substituted, 3,6-substituted fluorenyl; R' is hydrogen or hydrocarbyl radical having from 1–20 carbon atoms, a halogen, an alkoxy, an alkoxy alkyl or an alkylamino or alkylsilylo radical, each R' may be the same or different and m and n independently are 1, 2 3 or 4, with the proviso that the bilateral symmetry is maintained; R" is a structural bridge between X and the $(C_4R'_mC_5C_4R'_n)$ ring to impart stereorigidity; Q is a hydrocarbyl radical having 1–20 carbon atoms or is a halogen; Me is a Group IIIB, IVB, VB, or VIB metal as positioned in the Periodic Table of Elements; and Me can be in any of its theoretically possible oxidation states.

The present invention further provides a process for preparing syndiotactic/atactic block polyolefins, and more particularly syndiotactic/actactic block polypropylene using the above catalyst. The catalyst and process can each be adapted to produce a polymer with differing syndio-/atactic block ratios.

The invention also provides syndiotactic/atactic block homopolyolefins and particularly a syndiotactic/atactic block homopolypropylene, obtainable using the present catalysts.

One advantage of the present catalysts is that they are capable of producing syndiotactic/actactic block homopolyolefins which are not sticky and which exhibit a melt temperature, unlike polymers produced using prior art catalysts. In addition, the present catalysts show good activity as compared with prior art catalysts.

DETAILED DESCRIPTION OF THE INVENTION

The catalyst comprises a metallocene, i.e., a metal derivative of a cyclopentadiene, and an ionising agent. The metallocene compound contains only one substituted cyclopendadienyl ring and is of the general formula:

$$R''(C_4R'_mC_5C_4R'_n)XMeQ$$

wherein X is an hetero-atom ligand with one or two lone pair electrons and selected from the elements of Group VA or VIA and is preferably nitrogen, phosphorus, oxygen or sulfur, which can be substituted or non-substituted; $(C_4R_m'C_5C_4R_n')$ is a symmetrically substituted fluorenyl which is 3,6-substituted hydrogen or hydrocarbyl radical having from 1–20 carbon atoms, a halogen, an alkoxy, and alkoxy alkyl or an alkylamino or alkylsilylo radical, each R' may be the same or different and m and n independently are 0, 1, 2, 3 or 4, with the proviso that the bilateral symmetry is maintained; R' is a structural bridge between the X and $(C_4R_m'C_5C_4R_n')$ ring to impart stereorigidity and, preferably is a silyl or hydrocarbyl biradical having at least one silicon or carbon atom to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Peridic Table of Elements; Me can be in any of its theoretically possible oxidation states. Preferred metals for the catalyst of the invention are Zr, Ti, and Hf.

It is particularly preferred that the fluorenyl group is 3,6 substituted and not substituted at any other position.

The term "symmetrically" shall mean that the local bilateral symmetry of the active polymerisation sites is essentially maintained.

The present invention further provides a process for producing syndiotactic/atactic block polyolefins, particularly syndiotactic/atactic polypropylene. The process comprises utilising at least one of the catalysts described by the above formula and introducing the catalyst into a polymerisation reaction zone containing an olefin monomer. In addition, a co-catalyst such as alumoxane may be introduced into the reaction zone. Further, the catalyst may also be pre-polymerised prior to introducing it into the reaction zone and/or prior to the stabilisation of reaction condition in the reactor.

Metallocene catalysts are single site catalysts which, generally, produce polymers having a narrow molecular weight distribution.

While the present invention is mainly directed to α-olefin homopolymerisation, co-polymerisation with other olefins can be carried out.

The present invention also provides for a new polymer comprising alternating blocks of syndiotactic and atactic sequences, preferably long syndiotactic and short atactic sequences, most preferably comprising a fraction of syndiotactic triads (rr) of at least 70%.

A more complete appreciation of the invention and many of the attendant advantages thereof will be readily understood by reference to the following detailed description.

The present invention provides a polymer comprising alternating blocks of syndiotactic and atactic sequences. The polymer of the invention possesses particularly long sequences of syndiotactic species and short sequences of atactic species. The syndio-/atactic ratio can easily be modified by changing the polymerisation conditions and/or the catalyst structure within the invention. For example, as shown below, increasing the polymerisation temperature for a given catalyst decreases the syndio-/atactic ratio. As also evidenced below, replacing a dimethylsilyl bridge by a diphenylsilyl bridge also decreases the syndio-/atactic ratio for identical polymerisation conditions.

In the specific case of polypropylene, it ahs been noted that the polymer has elastomeric properties. Without being bound by the theory, it may be considered that these properties are deriving from the combination of the crystalline syndiotactic part and the amorphous atactic part.

The polymer obtained has a molecular weight ranging from 50,000 to more than 1,000,000 depending on the polymerisation conditions and on the catalyst used in the process. For example, as shown below, replacing a dimethylsilyl bridge by a diphenylsilyl bridge results in increased molecular weight under identical polymerisation conditions.

The present invention provides a catalyst and process for the production of syndiotactic/atactic block polyolefins, particularly polypropylene. The catalysts of the present invention produce a polymer with a syndiotactic/atactic block microstructure.

The applicants have now unexpectedly found that the catalyst of the invention can be used for the production of high molecular weight polyalphaolefin with stereoregular/stereoirregular block micro-structure.

When propylene or other alpha-olefins are polymerised using a catalyst consisting of a transition metal compound, the polymer product typically comprises a random mixture (reactor blend) of amorphous atactic and crystalline xylene insoluble fractions. The crystalline fraction may contain either isotactic or syndiotactic polymer or a mixture of both. The catalysts of the present invention have syndio-/atactic specificity and produce polymeric chains with differing syndio-/atactic block ratios.

The metallocene catalysts of the present invention may be described by the formula:

$$R''(C_4R'_mC_5C_4R'_n)XMeQ$$

wherein X is an hetero atom ligand with one or two lone pair electrons and selected from the elements of Group VA or VIA and is preferably nitrogen, phosphorus, oxygen or sulfur which can be substituted or not.

$(C_4R'_mC_5C_4R'_n)$ is a fluorenyl ring, substituted symmetrically and substituted at the 3 and 6 positions each R' is hydrogen or hydrocarbyl radical having form 1–20 carbon atoms, a halogen, an alkoxy, and alkoxy alkyl or an alkylamino or alkylsilylo radical, each R' may be the same or different, m and n independently are 0, 1, 2, 3 or 4, and with the proviso that the bilateral symmetry is maintained; R" is a structural bridge between the hetero atom X and $(C_4R'_mC_5C_4R'_n)$ ring to impart stereorigidity, and preferably is a silyl or hydrocarbyl biradical having at least one silicon or carbon atom to form the bridge; Q is a hydrocarbyl radical, such as an alkyl, aryl, alkenyl, alkylaryl or arylalkyl radical having 1–20 carbon atoms or is a halogen: Me is a Group IIIB, IVB, VB, or VIB metal as positioned in the Periodic Table of Elements; the transion metal can adopt any of the possible oxidation states. Preferred metals for the catalysts of the invention are Ti, Zr, and Hf. A particularly suitable metal is Ti. $(C_4R'_mC_5C_4R'_4)$ comprises hydrocarbyl biradicals bonded to two adjacent carbon atoms in a cyclopentadienyl ring to form a fused ring.

In order to obtain syndiospecificity the cyclopentadienyl or fluorenyl rings in the metallocene catalysts must be substituted in an essentially symmetric manner with respect to the active coordination positions so that the metallocene exhibits bilateral symmetry at least around the active coordination site. It has been unexpectedly noted that if in the original syndiospecific catalysts described in U.S. Pat. No. 4,892,851 the non-substituted cyclopentadienyl is replaced by a heteroatom ligand with one or two lone pair electrons and selected from elements of Group VA or VI A, the stereospecificity of catalyst will be periodically changed from syndiospecificity to aspecificity during the polymerisation giving rise to the formation of atactic blocks within the predominantly syndiotactic chain.

Bilateral symmetry is defined as the condition in which there is no substituent or one or more substituents on one side and no substituent or one or more substituents on the other side in the same relative position such that a mirror image is formed from one side to another. One preferred example of such a compound is 3,6-di-tert-butyl-9-fluorenyl-dimethylsilyl-tert-butylamido titanium dichloride.

An illustration of the ligands of this compound is shown in the diagrams presented in Tables 1 and 2.

Bilateral symmetry is illustrated by a plane bisecting the fluorenyl and the bridge resulting the right side of each ligand being a mirror image of its left side. The numerical positions of the fluorenyl ring represent the position of possible substituents on the fluorenyl ring, 9 being the position of the bridge.

Whilst not wishing to be bound by a theory and without intending to limit the scope of the present invention as indicated by the claims, it is believed that during the polymerisation reaction the growing polymer chain migrates from one coordination position to the other after each monomer insertion as the catalyst simultaneously isomerises and enchains sequences of polymer of the syndiotactic structure; occasionally this mechanism is disturbed by a haptocity change of the fluorenyl-transition metal bonding or through inversion of the chiral nitrogen center, leading to the loss of steric control and formation of short sequences of atactic blocks within a predominantly syndiotactic polymer chain. This mechanism differs from that put forward for syndiospecific catalysts such as the active species formed from isopropylidene [cyclopentadienyl-9-fluorenyl] zirconium dichloride as disclosed in U.S. Pat. No. 4,892,851 wherein the fluorenyl ring exhibits mainly pentahapto bonding, i.e. all five carbon atoms of the fluorenyl rings are coordinated with the zirconium atom.

It is believed that the catalysts of the present invention demonstrate a reversible transformation of syndiospecific sites to atactic specific sites through a haptocity change related stereoregulation/stereoderegulation mechanism.

In theory, the steric condition for a preferred orientation of the growing chain, adoption of one of the two possible conformations, intermittently disappears and the coordination and insertion of either of the propylene prochiral faces at both lateral coordination positions becomes accidental. This mechanism enchains atactic sequences in a predominantly syndiotactic polymer chain by a spontaneous change in haptocity of the bonding between the fluorenyl and the transition metal from pentahapto to tri- and possibly monohapto bonding which results in the loss of stereoregulating property of the sites.

This electro-dynamic behaviour of the active species provides in effect a temporary transformation of enantiotopic, equivalent sites to non-enantiotopic, non-equivalent environment at the lateral coordination positions, atactic sequences being formed whenever this occurs. Theoretically, only when both events, i.e. periodic loss of stereoregularity and the stereospecific character of the catalyst occur simultaneously, is a syndiotactic/atactic block homopolymer formed.

When catalysts of the present invention are used in polymerisation of olefins, the polymer which results is of a syndio-/atactic microstructure as illustrated below:

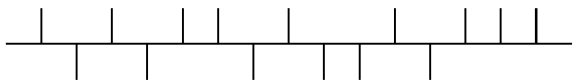

In a preferred embodiment of the catalyst of the present invention $(C_4R'_mC_5C_4R'_n)$ is preferably a substituted fluorenyl ring with bulky substituents in 3 and 6 positions such as tert-butyl and trimethylsilyl; Me is preferably titanium, zirconium or hafnium, more preferably; zirconium or titanium and most preferably titanium; Q is preferably a halogen and is most preferably chlorine; and R" is preferably a silyl or hydrocarbyl biradical of at least one silicon or carbon atom which is coordinated with the heteroatom ligand and with $(C_4R'_mC_5C_4R'_4)$, most preferably a silyl or hydrocarbyl biradical of at least one silicon or carbon atom being connected with heteroatom ligand and the $(C_4R'_mC_5C_4R'R_n)$ moiety.

Exemplary hydrocarbyl biradicals for the structural bridge include ethyl, propyl, butyl, pentyl, hexyl, heptyl, octyl, nonyl, decyl, and the likes. Other hydrocarbyl radicals useful as the structural bridge in the present catalysts include linear alkyl radicals of 1–10 carbon atoms or branched alkyl radicals of 1–20 carbon atoms, preferably one carbon atom, which may be substituted or unsubstituted, preferably substituted.

Exemplary silyl biradicals for a structural bridge include dimethylsilyl (which is preferred), diphenylsilyl of the general formula $R_2Si=$, with each R independently being any $C_1$–$C_{20}$ hydrocarbyl or $C_1$–$C_{20}$ mono-, di- or trialkyl silyl radicals.

The catalyst may be prepared by any method known in the art. Generally, the preparation of the catalyst complex consists of forming and isolating the substituted cyclopentadienyl or fluorenyl ligands which are then reacted with a halogenated metal to form the complex. The preferred method is that disclosed in U.S. Pat. No. 4,892,851. The catalyst may further be supported on an organic or inorganic carrier. The synthesis process generally comprises the steps of (1) preparing the halogenated or alkylated metal compound, (2) preparing the ligand, (3) synthesizing the complex, and (4) purifying the complex.

The metalocene catalysts of the present invention are useful in many of the polymerisation processes (solution, slurry or gas phase) known in the art including many of those disclosed for the preparation of crystalline or amorphous polypropylene. When the catalysts of the present invention are used in these types of processes, the processes produce syndiotactic/atactic block polymers.

Further examples of polymerisation processes useful in the practice of the present invention include those disclosed in U.S. Pat. No. 4,767,735 and European Patent Application 310,734, the disclosure of which are hereby incorporated herein by reference. Those preferred polymerisation procedures include the step of prepolymerising the catalyst and/or precontacting the catalyst with a cocatalyst and an olefin monomer prior to introducing the catalyst into a reaction zone.

The ionising agent is an alumoxane, an aluminium alkyl, other Lewis acid or a combination thereof which will ionise a neutral metallocene compound to form a cationic metallocene catalyst. Examples of such ionising agents are methyl alumoxane (MAO), triethyl aluminium (TEA1) and tris (pentafluorophenyl)boron. Other ionising agents are disclosed in European Patents 277003 and 277004 which are hereby incorporated by reference.

The syndio-/atactic-specific catalysts of the present invention are particularly useful in combination with an aluminium alkyl cocatalyst or with an alumoxane, preferably with the latter.

In addition, a complex may be isolated between a metallocene catalyst as described herein and an aluminium cocatalyst in accordance with teachings of European Patent 226,463. As disclosed therein, a metallocene is reacted with an excess of alumoxane in the presence of a suitable solvent. A complex of the metallocene and alumoxane may be isolated and used as a catalyst in the present invention.

The Alumoxanes useful in combination with the catalysts of the present invention, either in the polymerisation reaction or in forming the complex disclosed above, may be represented by the general formula (R—Al—O—)$_n$ in the cyclic form and R(R—Al—O—)$_n$AlR$_2$ in the linear form, wherein R is an alkyl group with one to five carbon atoms and n is an integer from 1 to 20. Most preferably, R is a methyl group and the preferred alumoxane is methylalumoxane (MAO). The alumoxanes can be represented structurally as follows:

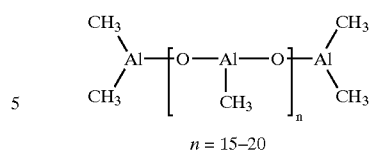

$n = 15$–$20$

The alumoxanes can be prepared by various methods known in the art. Preferably, they are prepared by contacting water with a solution of trialkyl aluminium, such as trimethyl aluminium, in a suitable solvent such as benzene. Another preferred method includes the preparation of alumoxane in the presence of a hydrated copper sulfate as described in U.S. Pat. No. 4,404,344 the disclosure of which is hereby incorporated by reference. This method comprises treating a dilute solution of trimethyl aluminium in toluene with copper sulfate. The preparation of other aluminium cocatalysts useful in the present invention may be prepared by methods known to those skilled in the art.

The Examples given below illustrate the present invention and its various advantages and benefits in more detail.

EXAMPLES

Example 1

The synthesis procedure was performed under an inert gas atmosphere using a Vacuum Atmospheres glovebox or Schlenk techniques.

Step 1: Preparation of 3,6-di-tert-butylfluorenyl-dimethylsilyl-chloride (1)

a) Aromatisation of the fluorene: In a one liter flask equipped with a magnetic stirring bar nitrogen inlet and reflux condenser, there was added 0.1 mol of a solution of 3,6-di-tert-butylfluorene in 300 cc of dietyl ether. To this solution was added at room temperature dropwise 0.1 equimol of methyllithium in ether (1.6 molar). The reaction was completed after gas evolution stops. The orange solution was used in the next step.

b) Reaction with dimethyldichlorosilane: The orange solution prepared in step 1a was added dropwise to a solution of 0.1 mol of dimethyldichlorosilane in 200 ml of ether. The mixture was stirred for several hours at room temperature until the reaction was completed.

Step 2: Preparation of tert-butyllithiumamide (2)

In a one liter flask equipped with magnetic stirring bar nitrogen inlet and reflux condenser, 0.1 mol of tert-butylamine was dissolved in 200 ml of diethyl ether. The solution was cooled to −78° C. One equimol of methyllithium in ether was added dropwise to the solution. The temperature was increased to room temperature slowly. The reaction mixture was stirred for several hours at room temperature until the formation of the title compound was complete.

Step3: Preparation of 3,6-di-tert-butylfluorenyl-dimethylsilyl-tert-butylamine (3)

The reaction products prepared in step 1 and step 2 were added together and stirred for several hours at room temperature. The LiCl formed as byproduct was filtered off and the ether filterated was subjected to evaporation. The title compound was obtained as a yellow oil.

Step 4:Preparation of 3,6-di-tert-butyl-dimethyl-tert-butylamido titanium dichloride (4)

a) Formation of dianion: 0.25 mol of (3) was dissolved in 200 ml of diethylether. To this solution was added dropwise 0.5 mol of methyllithium in ether. The solution became red. The reaction was stopped after gas evolution had stopped b) Reaction of the dianion with $TiCl_4$: The red powder obtained after evaporation of the ether from the solution resulting from step 4a was washed several times with pentane and then reacted with 0.25 mol of $TiCl_4$ in 200 ml pentane. The mixture was stirred for several hours at room temperature and filtered to separate the LiCl. Evaporation of the solvent led to the isolation of a brown powder. Recrystallisation of the product from dichloromethane provided spectroscopically pure product (4).

Example 2

Propylene was polymerised using the metallocenes produced by example 1.

Two liters of liquid propylene were introduced into a 4 l bench reactor at room temperature. The metallocene was placed in three milliliters of 11% solution of MAO in toluene to form a solution which was added to the reactor and the temperature increased to 40° C. the polymerisation reaction was allowed to run for 60 minutes during which time the reactor was maintained at the temperature indicated in Table 1 for each individual run. The reaction was terminated by venting the reactor of monomer. The catalyst activity in grams of polypropylene per grams of catalyst per hour was calculated. The molecular weight, molecular weight distribution and $^{13}C$ NMR analysis of the polymer were determined. The results are shown in Table 1.

The further examples below were carried out using a process analogous to that of Example 2.

Example 3: polymerisation of propylene with (4) at 60° C.

Example 4: polymerizartion of propylene with (4) at 80° C.

Example 5: polymerisation of Propylene with (4) at 40° C., in the presence of 3 Nl of $H_2$.

The polymerisation conditions and results are summarized in Table 1.

The variation of pentad stereosequence intensity distribution with polymerisation temperature for the above examples is shown in Table 2.

TABLE 1

Polymerization conditions and results for
$\mu$-(Me$_2$Si)(3,6di-tBuFlu)(tBuN)TiCl$_2$ - MAO system

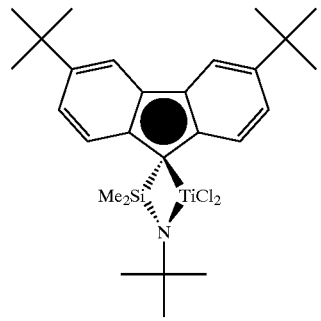

| Pol. Temp. (° C.) | Activity (kg/g) | Mw (kDa) | D | Mp (° C.) | rrrr (%) | rr (%) |
|---|---|---|---|---|---|---|
| 40 | 222 | 703 | 2.9 | 123 | 81.6 | 90.3 |
| 40(*) | 157 | 733 | 2.9 | 121 | 82.0 | 91.0 |
| 60 | 181 | 765 | 2.7 | 105 | 74.0 | 85.9 |
| 80 | 271 | 700 | 3.3 | No peak | 62.8 | 78.8 |

Polymerization were performed in a pressure reactor in liquid propylene with 850 ppm MAO;
(*):0.3 Nl H2

TABLE 2

Variation of pentad stereosequence intensity distributions
with polymerization temperature
for $\mu$-(Me$_2$Si)(3,6di-tBuFlu)(tBuN)TiCl$_2$ - MAO system

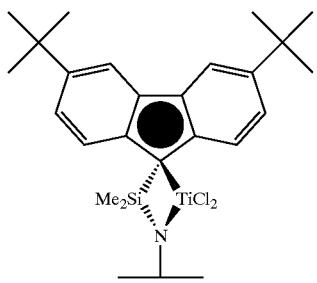

| Pol. Temp. (° C.) | mmmm (%) | mmmr (%) | rmmr (%) | mmrr (%) | rmrr + mrmm | mrmr (%) | rrrr (%) | mrrr (%) | mrrm (%) |
|---|---|---|---|---|---|---|---|---|---|
| 40 | 0.1 | 0.3 | 1.6 | 3.5 | 3.6 | 0.6 | 81.6 | 7.9 | 0.9 |
| 40(*) | 0.0 | 0.3 | 1.5 | 3.4 | 3.4 | 0.5 | 82.0 | 7.8 | 1.2 |
| 60 | 0.1 | 0.7 | 1.7 | 4.1 | 6.5 | 1.0 | 74.0 | 10.6 | 1.3 |
| 70 | 0.1 | 0.8 | 1.7 | 4.2 | 8.3 | 1.2 | 69.4 | 12.7 | 1.5 |
| 80 | 0.2 | 1.2 | 2.2 | 5.0 | 10.6 | 1.9 | 62.8 | 14.4 | 1.6 |

Polymerization condition
1l propylene; 5 ml MAO (11 wt% in toluene); 60 min.;
(*):0.3 Nl H2

What is claimed:

1. A catalyst for the polymerization of olefins of general formula:

wherein X is an hetero-atom ligand with one or two lone pair electrons selected from the elements of Group VA or VIA which can be substituted or non-substituted; $(C_4R_m'C_5C_4R_n')$ is a symmetrically substituted, 3,6-substituted fluorenyl; R' is hydrogen or hydrocarbyl radical having from 1–20 carbon atoms, a halogen, an alkoxy, an alkoxy alkyl or an alkylamino or alkylsilyl radical, each R' may be the same or different and m and n independently are 1, 2, 3 or 4, with the proviso that the bilateral symmetry is maintained; R" is a structural bridge between X and the $(C_4R'_mC_5C_4R'_n)$ ring to impart stereorigidity; Q is a hydrocarbyl radical having 1–20 carbon atoms or is a halogen; Me is a Group IIIB, IVB, VB, or VIB metal as positioned in the Periodic Table of Elements and Me can be in any of its theoretically possible oxidation states.

2. A catalyst according to claim 1, wherein the substituent of the fluorenyl radical is 3,6 di-tert-butyl-9-fluorenyl.

3. A catalyst according to claim 1, wherein the heteroatom ligand is selected from the group consisting of N, P, O and S.

4. A catalyst according to claim 1, wherein Me is selected from the group consisting of Ti, Zr and Hf.

5. A catalyst according to claim 1, wherein R" is preferably a silyl or hydrocarbyl biradical having at least one silicon or carbon atom to form the bridge.

6. A catalyst according to claim 5, wherein R" is dimethylsilyl.

7. A catalyst according to claim 1, wherein Q is selected from the group consisting of alkyl, aryl, alkenyl, alkylaryl and arylalkyl radicals.

8. A catalyst according to claim 3, wherein Me is selected from the group consisting of Ti, Zr, and Hf.

9. A catalyst according to claim 8, wherein R" is a silyl or hydrocarbyl biradical having at least one silicon or carbon atom to form the bridge.

10. A catalyst according to claim 9, wherein the substituent of the fluorenyl radical is 3,6-di-tert-butyl-9-fluorenyl.

11. A catalyst for the polymerization of olefins of the general formula:

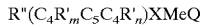

wherein X is an hetero-atom ligand with one or two lone pair electrons selected from the group consisting of N, P, O, and S, which can be substituted or non-substituted; $(C_4R'_mC_5C_4R'_n)$ is a symmetrically substituted, 3,6-substituted fluorenyl; R' is hydrogen or hydrocarbyl radical having from 1–20 carbon atoms, a halogen, an alkoxy, an alkoxy alkyl or an alkylamino or alkylsilyl radical, each R' may be the same or different and m and n independently are 1, 2, 3, or 4, with the proviso that the bilateral symmetry is maintained; R" is a structural bridge between X and the $(C_4R'_mC_5C_4R'_n)$ ring to impart stereorigidity and is a silyl or hydrocarbyl biradical having at least one silicon or carbon atom to form the bridge; Q is a hydrocarbyl radical having 1–20 carbon atoms or is a halogen; Me is a Group IIIB, IVB, VB, or VIB metal as positioned in the Periodic Table of Elements and Me can be in any of its theoretically possible oxidation states.

12. A catalyst according to claim 11, wherein Me is selected from the group consisting of Ti, Zr, and Hf.

13. The catalyst according to claim 12, wherein comprises N.

14. The catalyst according to claim 13, wherein $(C_4R'_mC_5C_4R'_n)$ comprises 3,6-di-tert-butyl-fluorenyl.

15. The catalyst of claim 14, wherein said catalyst is 3,6-di-tert-butyl-9-fluorenyldimethyl-tert-butylamido titanium dichloride.

* * * * *